United States Patent [19]

Hopkins, Sr.

[11] Patent Number: 4,485,561

[45] Date of Patent: Dec. 4, 1984

[54] PROCESS FOR HANGING FRAMED ARTICLES

[76] Inventor: William G. Hopkins, Sr., P.O. Box 6754, Greenville, S.C. 29606

[21] Appl. No.: 421,986

[22] Filed: Sep. 23, 1982

[51] Int. Cl.$^3$ .................... G01B 5/00

[52] U.S. Cl. .................... 33/180 R; 33/158

[58] Field of Search .................... 33/180 R, 158, 189

[56] References Cited

U.S. PATENT DOCUMENTS

| | | | |
|---|---|---|---|
| 1,240,853 | 9/1917 | Jachimowicz | 33/158 |
| 2,176,681 | 10/1939 | Paege | 33/158 |
| 2,608,766 | 9/1952 | Thein | 33/158 |
| 2,767,893 | 10/1956 | Latson | 33/158 X |
| 3,103,070 | 9/1963 | Looker | 33/158 X |
| 3,516,165 | 6/1970 | Pfeffer | 33/189 X |
| 4,241,510 | 12/1980 | Radecki | 33/180 R |

FOREIGN PATENT DOCUMENTS

| | | | |
|---|---|---|---|
| 961044 | 11/1949 | France | 33/158 |

*Primary Examiner*—William D. Martin, Jr.
*Attorney, Agent, or Firm*—Bailey & Hardaway

[57] ABSTRACT

A process for hanging framed articles utilizing a measuring device which has an elongated support with first and second moveable indicators. The process comprises vertically orienting the elongated support along a wall, moving the first indicator to a position corresponding to the desired placement of the top of the framed item, removing the elongated support from the wall and placing the first moveable indicator on the top of the framed item. The second moveable indicator is moved to a position corresponding to the hanging mechanism of the framed item. The elongated support is then again vertically aligned along the wall and the point for the location of a hanging device is located at the position of the second moveable indicator.

1 Claim, 4 Drawing Figures

PROCESS FOR HANGING FRAMED ARTICLES

BACKGROUND OF THE INVENTION

This invention relates generally to the art of hanging framed items, and more particularly to a method and apparatus for precisely positioning a picture or other framed item on a wall.

The accurate placement of pictures or other framed items on a wall within a dwelling such as a home or office has long been a problem. This problem is accentuated by the practice of having a hanging mechanism on the rear or back surface of a framed item. Various hanging mechanisms exist within the art. Normally such mechanisms comprise a wire which is suspended from both ends of the frame. Frequently, however, the hanging mechanism may be a rigid metallic loop or serrated surface for association with a picture hanging device, such as a nail, attached to a wall.

Rarely, if ever, do any two framed items have the same distance between the top surface of the frame and the point of placement of the hanging mechanism on the frame. For this reason various attempts have been made to routinize the art of picture hanging.

One such device is described in U.S. Pat. No. 3,516,165 to Pfeffer. The apparatus described and claimed therein is basically a linear device adapted to be vertically oriented with a hanging mechanism on one side thereof and a marking mechanism on the other. The device is operated by associating the hanging mechanism of a framed item with the hanging device of the hanging apparatus for movement about the room in order to locate a desired location. When a desired location is found the linear support is retained in position while the framed item is removed therefrom. The marking device on the rear portion of the apparatus is engaged with the wall to place a mark for the appropriate location of a hanging device. While this apparatus simplifies many of the problems associated with picture hanging it does not solve the problem associated with hanging a plurality of pictures or other framed items.

SUMMARY OF THE INVENTION

It is thus an object of this invention to provide an apparatus for locating appropriate points on a wall for the attachment of a hanging device.

It is a further object of this invention to provide a process for the use of such apparatus in the hanging of framed items.

It is a still further and more particular object of this invention to provide a process and apparatus for the hanging of framed items which greatly simplifies the determination of an appropriate location for hanging a plurality of framed items.

These as well as other objects are accomplished by an elongated linear support having first and second moveable indicators which are selectively slideable and positionable about said linear support. The apparatus is utilized by placing the linear support in a vertical orientation on a wall and adjacent a ceiling, and locating the first moveable indicator at a position corresponding to the desired position of the top of a framed item. The first indicator is then placed adjacent the top of the framed item, and the second moveable indicator moved to a position corresponding to the position of the hanging mechanism on the rear of the framed item. The linear support is then placed in a vertical orientation against the ceiling and the position of the second moveable indicator marked on the wall. The location of the mark thus corresponds to the appropriate location for the placement of a hanging device.

DETAILED DESCRIPTION

In accordance with this invention it has been found that plurality of framed items may be easily and readily hung upon a wall with each having a precise and predetermined distance between the upper surface of the frame and the ceiling of the room. The apparatus and process of this invention totally eliminate any trial and error utilized in the process of placing a framed item at a precise and desired location upon a wall. Further description of the invention will be given with reference to the various figures of drawing appended hereto.

Figure 1:
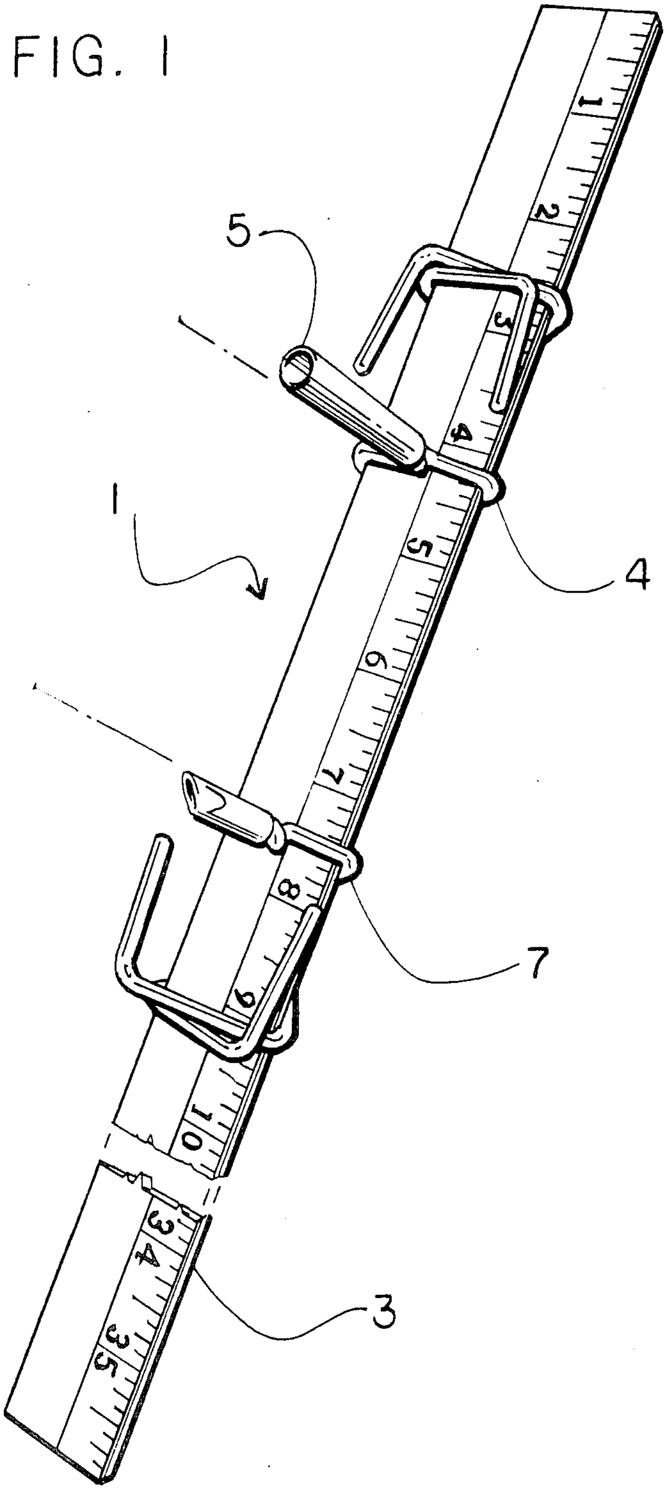
FIGS. 1 and 4 of the drawings illustrate a measuring device in accordance with this invention in a perspective view.

FIG. 1 of the drawing illustrates the apparatus 1 in accordance with this invention. The apparatus comprises an elongated linear support 3 which most desireably is a conventional yard stick having measuring indicia thereon. Associated with the linear support 3 is a first moveable indicator 4 having its point of indication at 5. A second moveable indicator 7 is located, as illustrated in FIG. 1, beneath the first moveable indicator. Each of the moveable indicators 4 and 7 are selectively, slideably moveable about the linear support 3 by means which will be further described.

Figure 2:
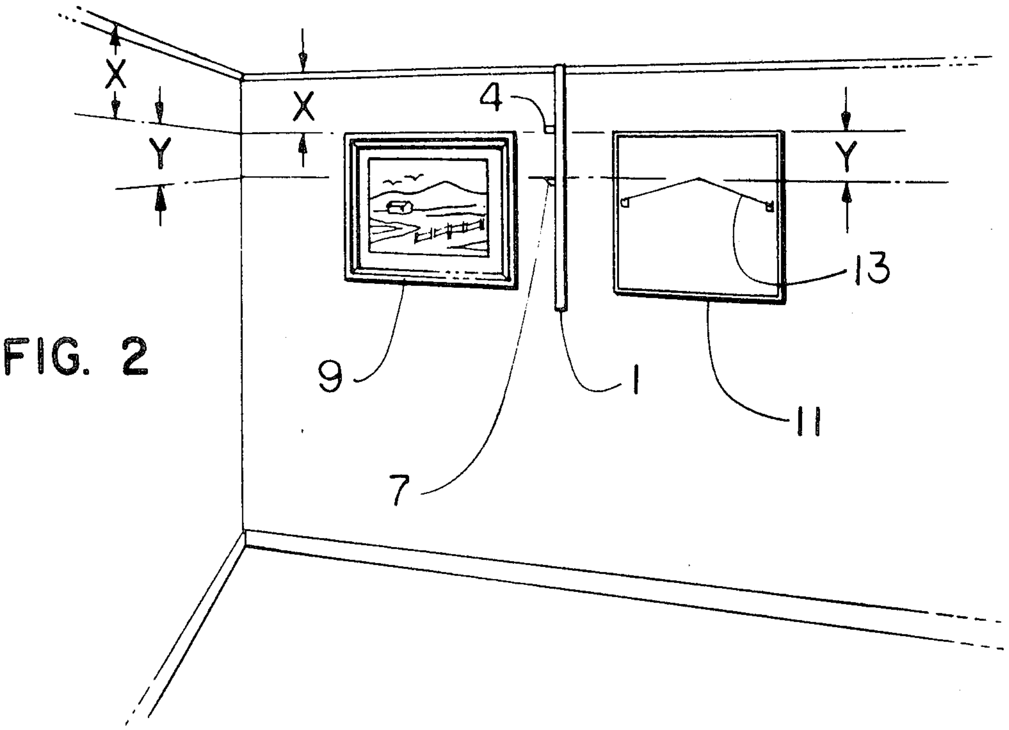
FIGS. 2 and 3 of the drawing illustrate the process of utilizing the measuring apparatus in accordance with this invention.
Figure 3:
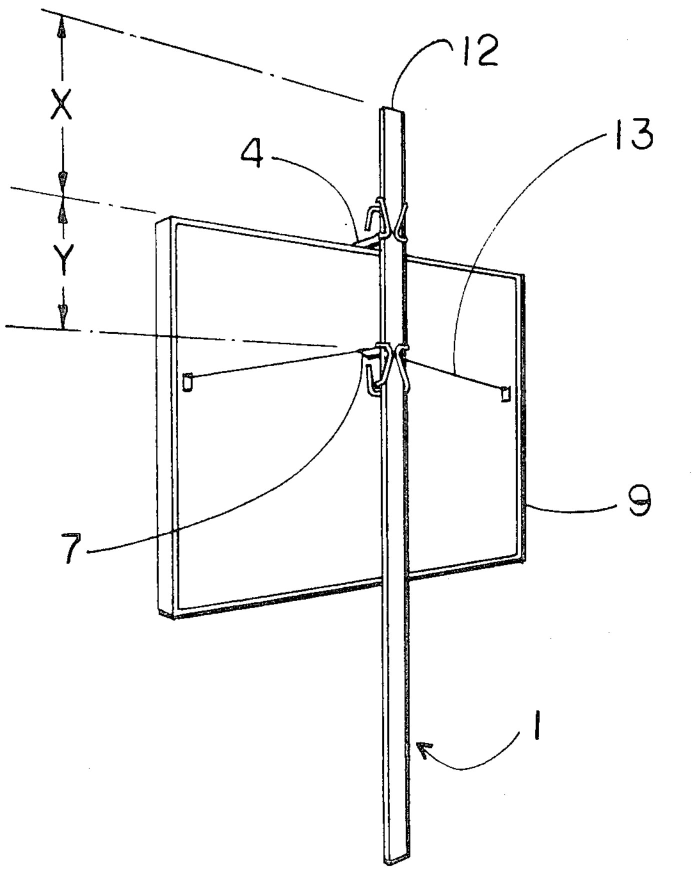

FIGS. 2 and 3 of the drawings illustrate a process of using the apparatus of this invention. With specific reference to FIG. 2 of the drawings, there is illustrated a framed item 9 which has been placed upon a wall at a desired location. In order to determine a precise location for a hanging device for a second framed item, the apparatus 1 of this invention is then placed along side the picture and first moveable indicator 4 placed upon the top of frame 9. FIG. 2 illustrates a second framed item 11 with the reverse side thereof depicted. Within frame 11 is hanging mechanism 13 in the form of a wire support attached to both sides of frame 11, which for purposes of illustration only is identical to the back of framed item 9 illustrated in FIG. 3.

FIG. 3 of the drawings illustrates the apparatus 1 of this invention with first moveable indicator 4 adjacent the top of frame 9 at a distance X from the end 12 of elongated linear support FIG. 1 thereof which is the same as the distance X illustrated in FIG. 2 and which corresponds to the desired distance between the ceiling and the top of frame 9. Second moveable indicator 7 is then placed within the hanging mechanism 13 of frame 9 at its point of hanging which is a distance Y from the top of first moveable indicator 4.

Apparatus 1 is then positioned as shown in FIG. 2 but with second moveable indicator 7 in its FIG. 3 position and the wall marked from the location of second moveable indicator 7, i.e., a total distance of X+Y from the ceiling. This marks the location for a hanging device to be located such that when the hanging device and hanging mechanism 13 are associated, the framed item will be located at the desire vertical location.

A significant and unexpected advantage of this invention is that a plurality of pictures may be hung with the top portions of the frames at an identical height without moving the location of first moveable indicator 4, but merely moving the location of second moveable incicator 7 to correspond to the location of the hanging mechanism on the various framed items.

Figure 4:
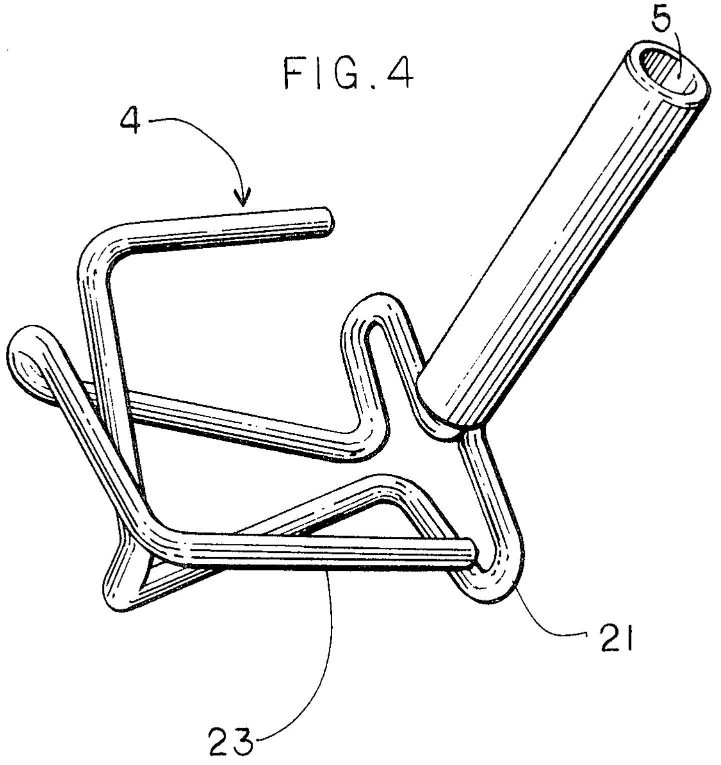

A significant part of this invention is the slideable movement of the various indicators. In the FIG. 4 drawing, the device 4 is illustrated with the linear support. The point of indication 5 is illustrated. A clamping mechanism 21 is illustrated with means 23 to disengage the clamp so as to make the overall indicator slideable and moveable about the vertical support, but while having the indicator substantially permanent unless the release means 23 are grasped so as to release the clamp 21.

It is understood that various modifications may be made to the apparatus of this invention. For example, a bubble level may be added to assist in vertical alignment of the linear support 3. Also, indicator 7 may be modified to hold a marking instrument such as chalk. It is also apparent that the apparatus may be utilized for placement of any item upon a wall and this description with reference to framed items is exemplory only. For example shelving may be properly positioned using the apparatus of this invention.

It is thus seen that the apparatus in accordance with this invention provides a novel apparatus for the placement of framed items upon the wall, as well as providing a novel process for the precise placement of framed items and particularly for the precise placement of a plurality of framed items. As many variations will be apparent to those with skill in the art from a reading of the above specifications, such variations are included within the spirit and scope of the following appended claims.

What is claimed is:

1. A process for locating an appropriate point on a wall for attaching a hanging device for a framed item, comprising:

providing a measuring device which comprises;
- an elongated linear support,
- a first moveable indicator selectively, slideably, moveable about the length of said linear measurer, and
- a second moveable indicator similar to said first moveable indicator;

placing said linear support in a vertical orientation against a ceiling adjacent a wall;

moving said first moveable indicator to a position corresponding to the desired placement of the top of a framed item;

removing said linear support from the wall;

placing said first moveable indicator on the top of the framed item desired to be hung;

moving said second moveable indicator to the position corresponding to the hanging mechanism of said framed item;

placing said linear support in vertical alignment with said wall and marking the vertical location of said second moveable indicator; and placing a hanging device at said mark for association with said hanging mechanism whereby said top of said framed item is located at said desired position.

* * * * *